Patented Sept. 6, 1949

2,480,940

UNITED STATES PATENT OFFICE 2,480,940

PRODUCTION OF ALIPHATIC ETHERS

Leonard N. Leum, Bywood, and Stephen J. Macuga, Lansdowne, Pa., and Saul I. Kreps, Bronx, N. Y., assignors to The Atlantic Refining Company, Philadelphia, Pa., a corporation of Pennsylvania No Drawing. Application September 20, 1946, Serial No. 698,400

7 Claims. (Cl. 260—614)

The present invention relates to the production of aliphatic ethers by the catalytic reaction of iso-olefins with alcohols, and relates more particularly to the production of mixed aliphatic ethers from iso-olefins containing from 4 to 16 carbon atoms per molecule and alcohols containing from 1 to 12 carbon atoms by reaction in the presence of an organic hydrogen-ion exchange catalyst at elevated temperature and pressure.

We have found that substantial yields of aliphatic ethers may be obtained from iso-olefins of 4 to 16 carbon atoms and primary or secondary alcohols containing from 1 to 12 carbon atoms by contacting a mixture of one or more of each thereof in the presence of an organic ion exchange material having exchangeable hydrogen ions at temperatures between 150° F. and 300° F. and under superatmospheric pressure.

The reaction may be carried out by contacting the iso-olefin, alcohol, and catalyst in a heated pressure vessel provided with means for insuring vigorous agitation, the contents of the vessel being removed upon completion of the reaction, and the products being separated by fractional distillation. Preferably, however, the reaction is carried out in a continuous manner by passing a mixture of iso-olefin and alcohol, in the proper ratio and at the proper space velocity, through a bed of catalyst contained in a pressure vessel under suitable conditions of temperature and pressure effective to promote the formation of the ether. The products of the conversion reaction may be separated from one another by fractionation, and unconverted iso-olefin and alcohol may be recycled to the system for further conversion.

The iso-olefins which may be employed include isobutylene, isoamylene, isohexylene, isoheptylene, iso-octylene, iso-nonylene, iso-decylene, iso-undecylene, iso-dodecylene, iso-tridecylene, iso-tetradecylene, iso-pentadecylene, and iso-hexadecylene, or mixtures of two or more thereof. The alcohols which may be utilized include the primary and secondary aliphatic alcohols of from 1 to 12 carbon atoms, such as methanol, ethanol, propanol, isopropanol, the primary and secondary butanols, pentanols, hexanols, ethylene glycol, propylene glycol, butylene glycol, the polyglycols, and glycerol, etc., or mixtures of two or more thereof. The tertiary aliphatic alcohols, as well as the normal olefins, do not appear convertible to ethers in accordance with the method of the present invention. The reaction temperatures may range from 150° F. to 300° F., and preferably fall between 210° F. to 250° F., with optimum conversions between 230° F. and 250° F. The pressure utilized in effecting the reaction may range from slightly superatmospheric, i. e., of the order of 30 to 50 pounds per square inch up to 500 pounds per square inch, excellent conversions having been obtained at 200 pounds per square inch. The mole ratio of iso-olefin to alcohol may range from 1 to 1 to 1 to 5, with good conversions in the range of 1 to 1 to 1 to 2. A ratio somewhat greater or smaller than given above may be utilized, if desired, but in most cases it is preferred to maintain at least polar equivalents of alcohol to iso-olefin. In carrying out the reaction, the space velocity of iso-olefin to catalyst may range from 0.1 gram to 5.0 grams of iso-olefin per gram of catalyst per hour, with good results at space velocities of 0.5 to 1.5.

The organic hydrogen ion exchange catalysts useful in accordance with the present invention are relatively high molecular weight, water-insoluble resins or carbonaceous materials containing a functional group such as $-SO_3H$, $-OH$, or $-COOH$, or a plurality of such groups. These catalysts are exemplified by the sulfonated coals (Zeo-Karb H, Nalcite X, and Nalcite AX) produced by the treatment of bituminous coals with sulfuric acid, and commercially marketed as zeolitic water softeners or base exchangers. These materials are usually available in a neutralized form, and must be activated by treatment with mineral acid, such as hydrochloric acid, and water washed to remove sodium and chloride ions prior to use in accordance with the present invention. Sulfonated resin type catalysts include the condensation products of phenol-formaldehyde with sulfuric acid (Amberlite IR-1, Amberlite IR-100, and Nalcite MX). Also useful are the sulfonated resinous polymers of courmarone-indene with cyclopentadiene, sulfonated polymers of courmarone-indene with furfural, sulfonated polymers of courmarone-indene with cyclopentadiene and furfural, sulfonated polymers of cyclopentadiene with furfural. Catalysts which may contain other functional groups such as $-OH$ or $-COOH$, in addition to $-SO_3H$ can be obtained in the form of hard, resinous granules by heating a sulfuric acid-soluble polymer of an aliphatic olefin at temperatures between 250° F. and 350° F. in the presence of sulfuric acid for a period of time sufficient to convert the mixture into a water-insoluble, hydrogen ion exchange compound. This type of catalyst may be derived from spent sulfuric acid catalysts which have been used in the alkylation of isoparaffins with olefins (for example, isobutane with butylenes), or in the polymerization of olefins and diolefins, which spent acid may contain from 5% to 20% of dissolved hydrocarbon polymers. The spent sulfuric acid containing the olefin polymers is heated between 250° F. and 350° F. for sufficient time to obtain solidification, but sulfonation may commence at a considerably lower temperature. The transformation from liquid to granular solid, which is accompanied by the evolution of $SO_2$, proceeds through the intermediate formation of a gel. In order to carry the reaction to completion, it is advisable to continue heating for an additional period subsequent to the granulation and hardening of the gel. The granular product is then washed with water to remove residual or excess acid, and is dried, the final material being hard, black, lustrous grains having hydrogen ion exchange properties. All of the catalysts mentioned above may lose their catalytic efficiency upon long continued use, but may be readily regenerated or reactivated by washing with dilute mineral acid, such as 2 N hydrochloric acid, and thereafter water washed prior to reuse in the ether-producing reaction.

The present invention may be further illustrated by the following examples, which however, are not to be construed as limiting the scope thereof.

A quantity of Zeo-Karb H, manufactured by the Permutit Company, and constituting the sodium salt of a sulfonated coal, was admixed with 2 N hydrochloric acid, and the mixture was thoroughly stirred for 2 hours, and then washed with water. This treatment was repeated three times, and the final product was washed free of sodium and chloride ions, and dried. The exchange capacity of the acid activated catalyst for calcium ions was found to be 1.47 milliequivalents of $Ca^+$ per gram of catalyst. The catalyst was then introduced into a tower provided with heating means, and thereafter a mixture of iso-olefin and alcohol was passed through the catalyst bed under various conditions of temperature, pressure, space velocity, etc., to convert the iso-olefin and alcohol to ether. The products of the reaction were withdrawn from the catalyst tower and separated by fractionation. The results obtained are given in the following table, the yields of ether being based upon once-through operation. Considerably higher yields could, of course, be obtained by recycling the unconverted iso-olefin and alcohol.

While, in the above examples, isobutylene alone was employed as the iso-olefin charge stock, it is likewise possible to obtain substantial yields of mixed ethers using hydrocarbon mixtures containing one or more iso-olefins. For example, a mixture of isobutylene and normal butylenes, with or without the corresponding paraffins, may be employed, the normal butylenes and butanes remaining substantially unconverted. It appears that only the iso-olefins are converted in accordance with the present invention, and it is therefore preferable to use iso-olefin charge stocks uncontaminated with normal olefins or paraffins in order to obtain the maximum conversion efficiency. Furthermore, while only simple aliphatic alcohols have been used in the above examples, mixtures thereof may be used, and particularly mixtures of the isomeric primary and secondary alcohols, the tertiary alcohols being substantially inert. The presence of the latter is of no particular concern, since they act simply as diluents and may somewhat decrease the efficiency of the conversion through their diluent effect.

We claim:

1. The method of producing an alkyl tertiary butyl ether, which comprises contacting isobutylene and an alcohol from the group consisting of primary and secondary saturated aliphatic alcohols of from 1 to 12 carbon atoms, in a mole ratio between 1 to 1 and 1 to 5, with an organic hydrogen ion exchange catalyst of the sulfonated resin type in which the functional group is $SO_3H$ at a temperature between 210° F. and 250° F. under a pressure between 200 and 500 pounds per square inch, and separating the tertiary butyl ether from unconverted reactants.

2. The method of producing methyl tertiary butyl ether, which comprises contacting isobutylene and methanol, in a mole ratio between 1 to 1 and 1 to 2, with a catalyst comprising essentially a sulfonated coal having hydrogen ion exchange properties, at a temperature between 210° F. and 250° F. under a pressure between 200 and 500 pounds per square inch, and separating the methyl tertiary butyl ether from unconverted reactants.

3. The method of producing ethyl tertiary butyl ether, which comprises contacting isobutylene and ethanol, in a mole ratio between 1 to 1 and 1 to 2, with a catalyst comprising essentially a sulfonated coal having hydrogen ion exchange properties, at a temperature between 210° F. and 250° F. under a pressure between 200 and 500 pounds per square inch, and separating the ethyl tertiary butyl ether from unconverted reactants.

4. The method of producing isopropyl tertiary butyl ether, which comprises contacting isobutylene and isopropanol, in a mole ratio between 1 to 1 and 1 to 2, with a catalyst comprising essentially a sulfonated coal having hydrogen ion exchange properties, at a temperature between 210° F. and 250° F. under a pressure between 200 and 500 pounds per square inch, and separating the isopropyl tertiary butyl ether from unconverted reactants.

5. The method of producing an alkyl tertiary butyl ether which comprises contacting isobutylene and an alcohol from the group consisting of primary and secondary saturated aliphatic alcohols of from 1 to 12 carbon atoms with an organic

| Run No. | 1 | 2 | 3 |
| --- | --- | --- | --- |
| Iso-olefin | isobutylene | isobutylene | isobutylene. |
| Alcohol | Methanol | ethanol | isopropanol. |
| Weight catalyst, grams | 75 | 75 | 75. |
| Weight iso-olefin, grams | 330 | 226 | 243. |
| Weight alcohol, grams | 206 | 201 | 289. |
| Alcohol/iso-olefin mol ratio | 1.10 | 1.08 | 1.10. |
| Catalyst Temp. °F | 244 | 250 | 239. |
| Pressure, p. s. i. | 200 | 200 | 200. |
| Space Velocity (g. olefin/g.cat./hr.) | 1.12 | 1.01 | 0.95. |
| Ether produced | methyl tertiary butyl ether. | ethyl tertiary butyl ether. | isopropyl tertiary butyl ether. |
| Wt. percent iso-olefin converted to ether | 77.3 | 61.8 | 29.7. | hydrogen ion exchange catalyst in which the functional group is a member of the class consisting of SO₃H, OH, and COOH at a temperature between 150° F. and 300° F. under superatmospheric pressure, and separating the alkyl tertiary butyl ether from unconverted reactants.

6. The method of producing an alkyl tertiary butyl ether which comprises contacting isobutylene and an alcohol from the group consisting of primary and secondary saturated aliphatic alcohols of from 1 to 12 carbon atoms with an organic hydrogen ion exchange catalyst in which the functional group is a member of the class consisting of SO₃H, OH, and COOH at a temperature between 210° F. and 250° F. under a pressure between 50 and 500 pounds per square inch and separating the alkyl tertiary butyl ether from unconverted reactants.

7. The method of producing an alkyl tertiary butyl ether which comprises contacting isobutylene and an alcohol from the group consisting of primary and secondary saturated aliphatic alcohols of from 1 to 12 carbon atoms in at least equi-molar quantities with an organic hydrogen exchange catalyst, in which the functional group is a member of the class consisting of SO₃H, OH, and COOH at a temperature between 210° F. and 250° F. under a pressure between 200 and 500 pounds per square inch, and separating the alkyl tertiary butyl ether from unconverted reactants.

LEONARD N. LEUM.
STEPHEN J. MACUGA.
SAUL I. KREPS.

REFERENCES CITED

The following references are of record in the file of this patent:

UNITED STATES PATENTS

| Number | Name | Date |
|---|---|---|
| 1,968,601 | Edlund | July 31, 1934 |
| 2,010,356 | Evans | Aug. 6, 1935 |

OTHER REFERENCES

Sussman, "Ind. and Eng. Chem.," vol. 38 (1946) pages 1228–1230.